(12) United States Patent
Ishioka et al.

(10) Patent No.: US 8,039,162 B2
(45) Date of Patent: Oct. 18, 2011

(54) UNIT CELL FOR SOLID POLYMER ELECTROLYTE FUEL CELL

(75) Inventors: Yutaka Ishioka, Nagoya (JP); Hideaki Tanahashi, Komaki (JP); Yasuhiko Mihara, Nagoya (JP)

(73) Assignee: Tokai Rubber Industries, Ltd., Komaki (JP)

( * ) Notice: Subject to any disclaimer, the term of this patent is extended or adjusted under 35 U.S.C. 154(b) by 1288 days.

(21) Appl. No.: 11/703,728

(22) Filed: Feb. 8, 2007

(65) Prior Publication Data

US 2007/0184327 A1 Aug. 9, 2007

(30) Foreign Application Priority Data

Feb. 9, 2006 (JP) ................................. 2006-032562

(51) Int. Cl.
- *H01M 2/08* (2006.01)
- *H01M 8/10* (2006.01)
- *H01M 8/02* (2006.01)

(52) U.S. Cl. ........ 429/452; 429/469; 429/479; 429/483; 429/508; 429/465

(58) Field of Classification Search .................. None
See application file for complete search history.

(56) References Cited

U.S. PATENT DOCUMENTS

| | | | |
|---|---|---|---|
| 4,194,059 | A | 3/1980 | Durand |
| 7,276,310 | B2 | 10/2007 | Kobayashi et al. |
| 7,776,490 | B2 * | 8/2010 | Sugiura et al. ............... 429/514 |
| 2002/0086196 | A1 | 7/2002 | Utsunomiya et al. |
| 2002/0117780 | A1 | 8/2002 | Inoue et al. |
| 2004/0038102 | A1 | 2/2004 | Beckmann et al. |
| 2004/0096730 | A1 * | 5/2004 | Kuroki et al. ................... 429/44 |
| 2004/0121215 | A1 * | 6/2004 | Fujii et al. ....................... 429/35 |
| 2004/0131905 | A1 | 7/2004 | Enjoji et al. |
| 2004/0142226 | A1 | 7/2004 | Yamauchi et al. |
| 2004/0219416 | A1 | 11/2004 | Lundsgaard et al. |
| 2005/0123819 | A1 | 6/2005 | Hiroi et al. |
| 2005/0227132 | A1 | 10/2005 | Hori et al. |
| 2006/0024556 | A1 | 2/2006 | Ishioka et al. |
| 2006/0024560 | A1 | 2/2006 | Ishioka et al. |

FOREIGN PATENT DOCUMENTS

| | | |
|---|---|---|
| EP | 1 255 315 A1 | 11/2002 |
| EP | 1 450 427 A1 | 8/2004 |
| EP | 1 511 103 A2 | 3/2005 |
| EP | 1 622 217 A2 | 2/2006 |
| GB | 2 400 723 A | 10/2004 |
| JP | A 11-045729 | 2/1999 |

(Continued)

*Primary Examiner* — Barbara Gilliam
*Assistant Examiner* — Angela Martin
(74) *Attorney, Agent, or Firm* — Oliff & Berridge, PLC

(57) ABSTRACT

A unit cell for use in a solid polymer electrolyte fuel cell comprising: a membrane/electrode assembly including a fuel electrode and an oxidant electrode disposed on either side of a solid polymer electrolyte membrane, the assembly being sandwiched from either side by a first separator and a second separator to give a stacked construction to form therebetween a fuel gas flow passage and an oxidant gas flow passage. The solid polymer electrolyte membrane has a projecting portion projecting outwardly beyond the fuel electrode and the oxidant electrode, and the projecting portion is coated by a reinforcing resin member. Connecting grooves formed on a primary face of the separators connecting both ends of the fuel gas/oxidant gas flow passages with a fuel/oxidant gas feed/discharge ports, respectively. The reinforcing resin member is placed so as to bridge openings of the connecting grooves in order to give a tunnel construction to the connecting grooves.

10 Claims, 7 Drawing Sheets

FOREIGN PATENT DOCUMENTS

| | | |
|---|---|---|
| JP | A 2000-133289 | 5/2000 |
| JP | A 2000-294254 | 10/2000 |
| JP | A 2002-083610 | 3/2002 |
| JP | 2002-260693 * | 9/2002 |
| JP | A 2002-260693 | 9/2002 |
| JP | A 2003-068319 | 3/2003 |
| JP | A 2004-207074 | 7/2004 |
| JP | A 2004-319461 | 11/2004 |
| WO | WO 95/22179 A1 | 8/1995 |
| WO | WO 2004/102710 A1 | 11/2004 |

* cited by examiner

UNIT CELL FOR SOLID POLYMER ELECTROLYTE FUEL CELL

INCORPORATED BY REFERENCE

The disclosure of Japanese Patent Application No. 2006-032562 filed on Feb. 9, 2006 including the specification, drawings and abstract is incorporated herein by reference in its entirety.

BACKGROUND OF THE INVENTION

1. Field of the Invention

The present invention relates in general to a unit cell for use in a solid polymer electrolyte fuel cell that employs a solid polymer electrolyte membrane, and to a solid polymer electrolyte fuel cell wherein a plurality of unit cells are stacked.

2. Description of the Related Art

Fuel cells have been noticed as to their ability to be an electric generator. As one example of these fuel cells, a solid polymer electrolyte fuel cell is known generally. As is well known, the solid polymer electrolyte fuel cell is able to produce electrical power by means of an electrochemical reaction when supplied with oxygen (air) as an oxidant and hydrogen as a fuel, these being supplied onto the surfaces of a pair of catalyst electrodes superposed against either face of an electrolyte which is a solid polymer electrolyte membrane, such as a solid ion exchange membrane or the like.

In solid polymer electrolyte fuel cells, it is important that these be consistent supply of oxygen and hydrogen onto the surfaces of the catalyst electrodes in order to consistently and efficient produce the intended voltage. It is also important for the appropriate temperature to be maintained. Accordingly, there is typically employed a cell of a structure wherein a membrane/electrode assembly (MEA) composed of a breathable porous membrane oxidant electrode and a fuel electrode disposed on either side of the solid polymer electrolyte membrane is assembled with a first separator superposed against the oxidant electrode face thereof and a second separator superposed against the fuel electrode face thereof. A plurality of such unit cells are stacked and electrically connected directly to produce the desired voltage.

An oxidant gas flow passage is formed by means of covering with the oxidant electrode a recess disposed on the first separator, and fuel gas flow passage is formed by means of covering with the fuel electrode a recess disposed on the second separator. A coolant flow passage is formed by a recess disposed in a secondary face of the first separator or second separator on the back side from a primary face which is superposed against the electrode, by covering the recess with the secondary face of another adjacent cell.

At respective peripheral edges of stacked unit cells, there are formed perforating therethrough in the stacking direction an oxidant gas inlet and an oxidant gas outlet, a fuel gas inlet and a fuel gas outlet, and a coolant inlet and a coolant outlet. The oxidant gas inlet and oxidant gas outlet are connected to both ends of the oxidant gas flow passage, whereby oxidant gas is supplied to the membrane/electrode assembly through the oxidant gas flow passage. Likewise, the fuel gas inlet and the fuel gas outlet are connected to both ends of the fuel gas flow passage, thereby supplying fuel as to the membrane/electrode assembly through the fuel gas flow passage. In addition, the coolant inlet and coolant outlet are connected to both ends of the coolant flow passage, circulating coolant through the coolant flow passage.

However, these solid polymer electrolyte fuel cells of conventional construction may still suffer from disability in producing sufficient electrical power. Namely, for ensuring an excellent capability of electric power generation, it is important that the membrane/electrode assembly and separators be assembled together with a high precision alignment. Since the membrane/electrode assembly employed in the conventional fuel cell is considerably thin, it was significantly difficult to dispose the membrane/electrode assembly between the first and second separators with a high precision alignment thereto.

JP-A-11-045729 or other documents propose a use of a frame disposed covering the peripheral edge of the solid polymer electrolyte membrane of the membrane/electrode assembly. With this arrangement, the membrane/electrode assembly is reinforced, making it possible to precisely install the membrane/electrode assembly between the first and second separators with ease and precision.

In order to produce an electric voltage with stability, the solid polymer electrolyte fuel cell shall should ensure an stable supply of the oxygen gas (oxygen) and the fuel gas (hydrogen) to respective surfaces of the catalyst electrodes. For the stable supply of these gases, it is important to prevent a leakage of gases through gaps formed between the separators or between the separator and the membrane/electrode assembly. To meet this ends, the conventional solid polymer electrolyte fuel cell, as shown in JP-A-2000-294254 etc., sealing rubber layers are disposed between the adjacent ones of the mutually stacked membrane/electrode assemblies and separators so that the membrane/electrode assemblies and separators are stacked on one another via the sealing rubber layers, thereby preventing gas leakage through gaps between the stacked members. Typically, the sealing rubber layers are arranged for surrounding the fuel gas flow passage and the oxidant gas flow passage.

However, the sealing rubber layer employed in the conventional solid polymer electrolyte fuel cell may cause the gas leakage problem at around connecting portions between the gas flow passages and gas inlets/outlets. Described more specifically, the sealing rubber layer is arranged for fringing the gas flow passages and the gas inlets/outlets connected to the gas flow passages. Therefore, if the membrane/electrode assembly of a flat plate shape is smaller than the separators and located inside the gas inlets/outlets, the peripheral edge portion of the membrane/electrode assembly is partially located on the gas flow passage and the connecting flow passage, leading to a risk that gas fed to one side of the membrane/electrode assembly leak into the other side. That is, since the solid polymer electrolyte membrane is a sheet considerably thin and readily deformable, its peripheral edge portion placed on and exposed to the flow passages will be readily deformed due to gas feeding pressure, thereby producing gaps between the separators and the membrane/electrode assembly. Thus, there was a risk that the fuel gas and the oxidant gas could leak around the peripheral edge of the membrane/electrode assembly into the other side.

Another measure has been proposed to prevent the gas leak around the peripheral edge of the membrane/electrode assembly. For instance, it may be possible to form a connecting flow passage by utilizing a groove open in the primary face of the separator. The opening of the groove is covered by means of a rigid lid member fitted thereon in a bridging fashion, so that the connecting flow passage is of tunnel construction. This lid member is provided with a sealing rubber layer bonded thereto. By sandwiching the peripheral edge portion of the membrane/electrode assembly (solid polymer electrolyte fuel cell) between the sealing rubber layer formed on the separator and the sealing rubber layer formed on the lid member, the gas leak around the peripheral edge of the membrane/ electrode assembly can be prevented. This measure is able to prevent the gas leak effectively, but on the other hand, it needs an additional component independent of the separator, resulting in the increased number of components and deterioration in production efficiency due to the need for a precise alignment of the lid member.

SUMMARY OF THE INVENTION

It is therefore one object of this invention to provide a unit cell of novel construction for use in a solid polymer electrolyte fuel cell, which is capable of ensuring a consistently high level of sealing with a reduced number of components, without needing a specific member. It is another object of the present invention to provide a solid polymer electrolyte fuel cell using the novel cells.

The above and/or optional objects of this invention may be attained according to at least one of the following aspects of the invention. The following aspects and/or elements employed in each aspect of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

One aspect of the present invention provides a unit cell for use in a solid polymer electrolyte fuel cell including: a membrane/electrode assembly having a fuel electrode and an oxidant electrode disposed on either side of a solid polymer electrolyte membrane, the assembly being sandwiched from either side by a first separator and a second separator to give a stacked construction; a fuel gas flow passage formed between opposed faces of the fuel electrode and the first separator; and an oxidant gas flow passage formed between opposed faces of the oxidant electrode and the second separator, wherein the solid polymer electrolyte membrane in the membrane/electrode assembly has a planar shape slightly larger than the fuel electrode and the oxidant electrode so that an entire perimeter of an outer peripheral edge portion of the solid polymer electrolyte membrane forms an projecting portion projecting outwardly beyond outer peripheral edges of the fuel electrode and the oxidant electrode, and the projecting portion of the solid polymer electrolyte membrane is coated by a reinforcing resin member affixed thereto, wherein the first separator has a primary-face sealing rubber layer affixed onto a primary face thereof so that the reinforcing resin member is stacked on the first separator via the primary-face sealing rubber layer, and connecting grooves formed on the primary face thereof for connecting both ends of the fuel gas flow passages with a fuel gas feed/discharge ports respectively, which are formed perforating through the first separator, wherein the second separator has a primary-face sealing rubber layer affixed onto a primary face thereof so that the reinforcing resin member is stacked on the second separator via the primary-face sealing rubber layer, and connecting grooves formed on the primary face thereof for connecting both ends of the oxidant gas flow passage with an oxidant gas feed/discharge ports respectively, which are formed perforating through the second separator, and wherein the reinforcing resin member is placed so as to bridge openings of the connecting grooves in order to give a tunnel construction to the connecting grooves.

In the unit cell for solid polymer electrolyte fuel cells of construction according to this mode, the projecting portion of the solid polymer electrolyte membrane projecting to the outer peripheral edge of the membrane/electrode assembly is coated or covered by the reinforcing resin member, and the reinforcing resin member is disposed so as to bridge or extend across over openings of the first and second connecting grooves. With this arrangement, the connecting portions between the gas flow passages and gas feed/discharge ports can be kept in tunnel shape, thereby effectively preventing leakage of the fuel gas or oxidant gas from the connecting portion, i.e., the first and second connecting grooves. Further, in order to ensure gas-tight sealing, the openings of the first and second connecting grooves are tightly closed by means of the reinforcing resin member of the membrane/electrode assembly, in addition to keep the connecting grooves in tunnel construction. This means that no special component is needed to cover the openings of the connecting grooves, thus ensuring the reduced number of components. In addition, since the outer peripheral edge portion of the solid polymer electrolyte membrane (membrane/electrode assembly) is reinforced by means of the reinforcing resin members bonded thereto, the deformation of the solid polymer electrolyte membrane (membrane/electrode assembly) due to the pressure of the fuel gas and oxidant gas flowing through the connecting grooves can be effectively prevented. This is effective to prevent the formation of a gap between the solid polymer electrolyte membrane and the first and/or second separator stacked thereon, thereby preventing the leakage of the fuel and/or oxidant gas through the gap into the other side of the solid polymer electrolyte membrane. Furthermore, the reinforcing resin member is bonded onto the outer peripheral edge portion of the solid polymer electrolyte membrane, so that the gas leakage through a gap between the reinforcing resin member and the solid polymer electrolyte membrane can be avoided.

Preferably, the reinforcing resin member includes at least one reinforcing bar, while the fuel electrode and the oxidant electrode includes a plurality of electrode segments divided by means of the reinforcing bar. This arrangement effectively ensures reinforcement of the solid polymer electrolyte membrane by means of the reinforcing resin member.

In another preferred practice, each connecting groove includes at least one supporting projection projecting upward from a bottom face of the connecting groove, and a portion of the reinforcing resin member extending across the opening of the each connecting groove is held in contact with and supported by the supporting projection. With this arrangement, the opening of the part of the reinforcing resin member disposed above the connecting groove of the one separator can be sandwiched between and supported by the supporting projection and the other separator. This further ensure stability of the tunnel construction of the connecting groove serving as a gas flow passage, thereby effectively preventing leakage of the gas to the other side of the solid polymer electrolyte membrane.

In yet another preferred practice, each connecting groove includes a plurality of supporting projections each extending continuously with a given length in a lengthwise direction of the connecting groove, which are arranged in a widthwise direction of the connecting groove while being spaced away from one another. This arrangement is effective to increase the contact area between the support projections and the reinforcing resin member, while ensuring abutting contact between the support projections and the reinforcing resin member over a large extent, making it possible to effectively stabilizing the cross sectional shape of the gas flow passages formed by means of the connecting grooves, thereby preventing leakage of the gas.

In a further preferred practice, the fuel gas flow passage and the oxidant gas flow passage extend straightly with both ends connected respectively with pairs of gas-reserving zones extending in a widthwise direction of the fuel gas flow passage and the oxidant gas flow passage, respectively, while the pairs of gas-reserving zones are respectively connected to the fuel gas feed/discharge ports and the oxidant gas feed/discharge ports so that the fuel gas and oxidant gas are reserved temporarily within the gas-reserving zones. With this arrangement, the fuel/oxidant gas can be temporarily reserved within the gas-reserving zone, before fed into the gas flow passage, so that the fed gas pressure can be stabilized. In addition, the fuel/oxidant gas flow passages extends straightly, effectively avoiding pressure loss in comparison with the case where the gas flow passages are bent or curved. This ensures a supply of fuel/oxidant gas with stabilized pressure, thereby effectively avoiding deterioration of sealing capability due to locally increased fed gas pressure, or the like, leading to efficient power generation capability with stability.

In a yet further preferred practice, the primary-face sealing rubber layer is arranged for surrounding at least perimeters of zones forming the fuel gas flow passage and the oxidant gas flow passage respectively, as well as the fuel gas feed/discharge ports and the oxidant gas feed/discharge ports respectively, and wherein the primary-face sealing rubber layer includes an MEA sealing ridge integrally formed at a portion to be superposed on the reinforcing resin member that projects outward in a superposing direction and is formed continuously. With this arrangement, the primary-face sealing rubber layer is also to surround and seal the approximately entire of the fuel gas passage and the oxidant gas passage, thereby preventing the gas leakage. In addition, by means of the MEA sealing ridge 58 formed on the primary-face sealing rubber layer, the reinforcing resin member and each separator are superposed on each other in a fluid-tight fashion, thereby preventing effectively the gas leakage between these components.

In yet another preferred practice, the primary-face sealing rubber layer affixed onto the primary face of the first separator includes a primary-face sealing ridge of continuous projection arranged for surrounding the fuel gas feed/discharge ports and the oxidant gas feed/discharge ports, while the primary-face sealing rubber layer affixed onto the primary face of the second separator has a planar surface at a portion on which the primary-face sealing ridge is superposed. With this arrangement, the fluid-tight sealing between the first separator and the second separator can be ensured by means of compression contact between the primary-face sealing ridge and the planar surface of the primary-face sealing rubber layer. This compression contact between the two components can be realized without needing sophisticated alignment between the first and second separators in the direction orthogonal to the stacking direction of the two separators. Thus, the fluid-tight sealing between the first and second separators can be stably realized without being influenced by the positioning errors upon assembly.

In still another preferred practice, each of the first separator and the second separator includes a separator reinforcing member affixed to an entire outer peripheral edge thereof, and one of a fitting groove and a fitting projection is formed on a surface of the separator reinforcing member of one of the first and second separators, while the other of the fitting groove and the fitting projection is formed on a surface of the separator reinforcing member of the other of the first and second separators so that the separator reinforcing members of the first and second separators are superposed on and fixed to each other by means of mating between the fitting groove and the fitting projection. With this arrangement, the separator reinforcing member prevents the separator from being deformed, for example being bent or curved. In addition, the separator reinforcing member includes at least one of the fitting groove and the fitting projection, making it easy to positioning separators in the stacking direction of the separators.

In a yet further preferred practice, the separator reinforcing member is made of a synthetic resin material by means of an injection molding using a mold including a pair of reinforcing portion gripping the outer peripheral edge of the separator. This arrangement can prevent deformation of the separator due to injection pressure of the synthetic resin material during injection molding of the separator reinforcing member.

Another aspect of the present invention provides a solid polymer electrolyte fuel cell comprising a plurality of unit cells of construction as discussed above wherein the unit cells are stacked in a sandwich direction of the first and second separators with respect to the membrane/electrode assembly. This provides a solid polymer electrolyte fuel cell can realize efficient power generation with stability, while preventing leakage of the fuel gas and the oxidant gas.

Preferably, each of the first and second separators includes a conducting contact part formed at a portion outside the zone forming a fuel gas flow passage or the oxidant gas flow passage projecting toward the secondary face so that the conducting contact part of the first separator and the conducting contact part of the second separator are held in contact with each other with the unit cells stacked. According to this arrangement, the voltage generated in each unit cell can efficiently collected through the conducting contact parts mutually connected together.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
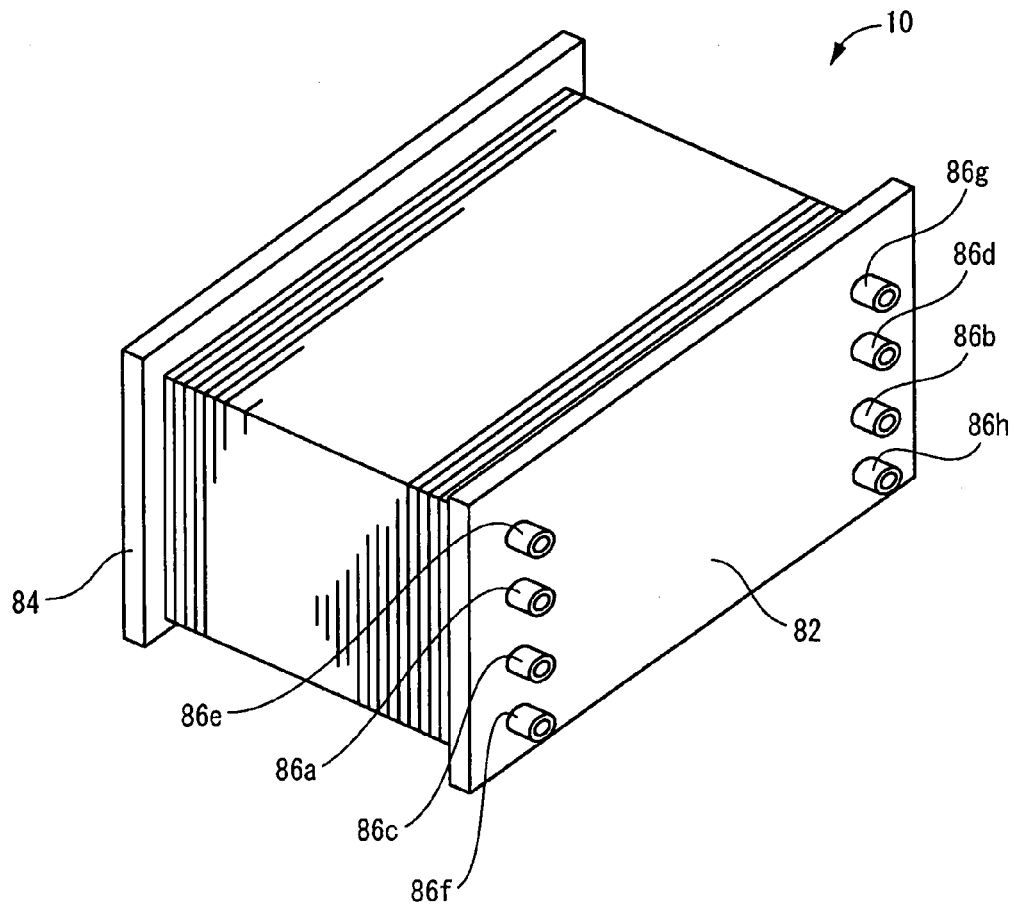
FIG. 1 is a perspective view of a solid polymer electrolyte fuel cell composed of unit cells of construction according to a first embodiment of the present invention.

A simplified perspective view of a solid polymer electrolyte fuel cell (PEFC) 10 composed of a stack of multiple unit cells 12 constructed according to the invention is depicted in FIG. 1. The solid polymer electrolyte fuel cell 10 depicted in FIG. 1 is arranged with the vertical and sideways directions in the illustrated state aligned with the plumb-bob vertical and horizontal directions. In the description hereinafter, as a general rule, the vertical and sideways directions, and plumb-bob vertical and horizontal directions, refer to those in the state illustration in FIG. 1.

Figure 2:
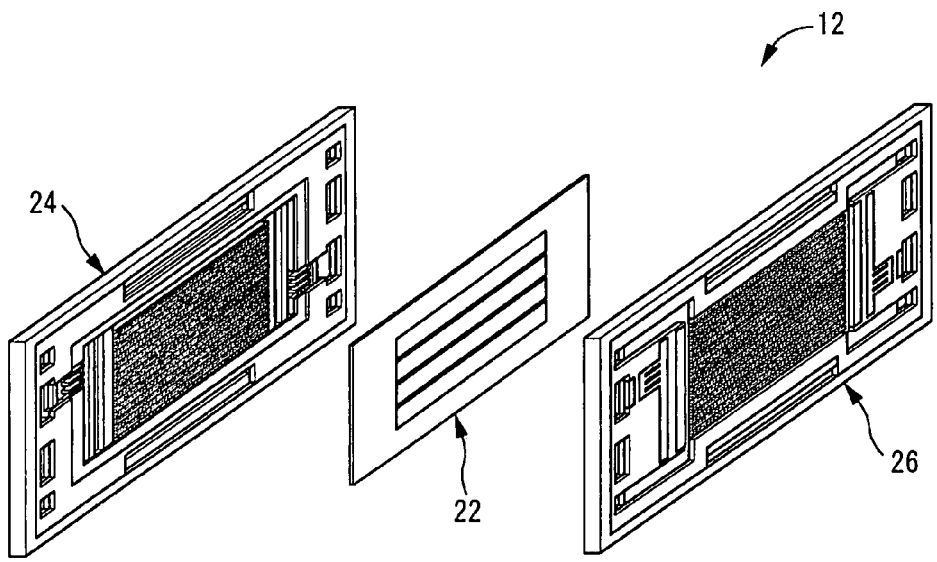
FIG. 2 is an exploded perspective view showing a construction of a unit cell of the solid polymer electrolyte fuel cell of FIG. 1.

More specifically, as shown in FIG. 2, the unit cells 12 making up the solid polymer electrolyte fuel cell 10 comprise a membrane/electrode assembly (MEA) 18 having as the electrolyte a solid polymer membrane 14 as a solid polymer electrolyte membrane such as a solid ion exchange membrane with a fuel electrode 16a and an oxidant electrode 16b as a pair of catalyst electrodes superposed to either side thereof and joined and unified therewith. In the present embodiment, each of the solid polymer membrane 14, the fuel electrode 16a and the oxidant electrode 16b is of a rectangular planar shape. The solid polymer membrane 14 has an area greater than those of the fuel electrode 16a and the oxidant electrode 16b, so that with these mutually superposed to form the membrane/electrode assembly 18, the entire outer peripheral edge of the solid polymer membrane 14 extends outwardly beyond the fuel and oxidant electrodes 16a, 16b, thereby forming a projecting portion 19.

According to the known art, the fuel electrode 16a and the oxidant electrode 16b contain a platinum catalyst, and are formed, for example, from carbon or other conductive material, with a porous structure so as to permit gas to pass through. However, inclusive of the material of the solid polymer membrane 14, the material and microzone structure of the membrane/electrode assembly (MEA) 18 composed including the fuel electrode 16a and an oxidant electrode 16b are not characteristic features of the invention, but may be produced through application of known art technology, and as such will not be described in detail.

The projecting portion 19 of the solid polymer membrane 14, which projects outwards beyond the fuel and oxidant electrodes 16a, 16b, is coated by a reinforcing resin member such as a resin film 20 affixed thereto, thereby providing a MEA component 22 including the resin film 20, the solid polymer membrane 14, the electrodes 16a, 16b. The resin film 20 is formed of resin materials, such as polypropylene and PPS (poly phenylene sulphide), and has a thin frame body shape overall. The resin film 20 puts on and bonded to the projecting portion 19 of the solid polymer membrane 14, whereby the solid polymer membrane 14 is reinforced with the resin film 20. The resin film 20 has an outside shape somewhat larger than the solid polymer membrane 14, thus it projects outwards beyond the solid polymer membrane 14.

Figure 3:
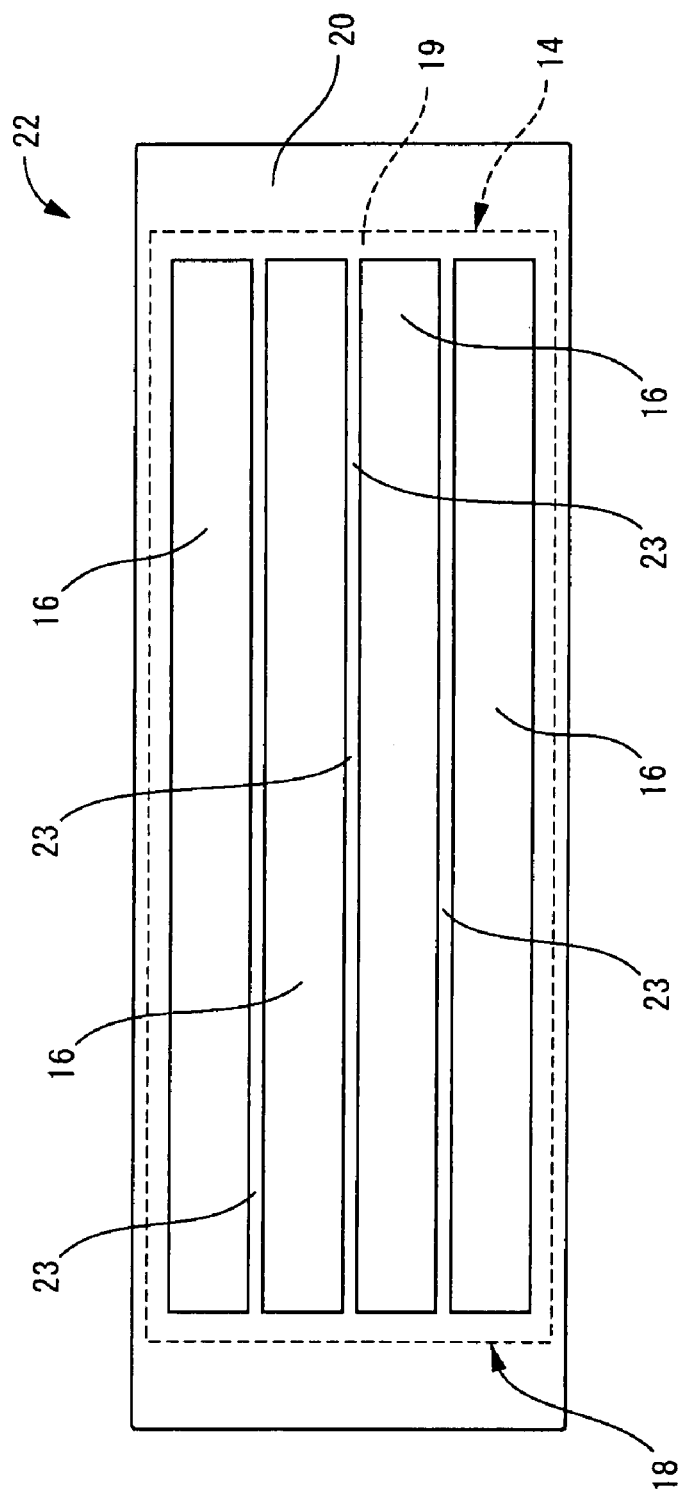
FIG. 3 is a front elevational view of an MEA component of the unit cell of FIG. 1

As will be apparent from FIG. 3, the resin film 20 is of a thin rectangular flame body shape long to a horizontal direction as seen in the front view. In the vertically intermediate portion of the resin film 20, there are formed a plurality of reinforcing bars 23 each extending in the horizontal direction (wide widthwise direction in FIG. 3). These reinforcing bars 23 work to prevent deformation of the resin film 20 effectively. According to the shape of the resin film 20, the fuel electrodes 16a and the oxidant electrode 16b are divided into several sections opposed to one another with the reinforcing bars 23 interposed. In the present embodiment, as shown in FIG. 3, the three reinforcing bars 23 are arranged at equal intervals in the vertical direction of the resin film 20, and the fuel electrode 16a or the oxidant electrode 16b are divided into four sections arranged in the vertical direction with these reinforcing bars 23 interposed therebetween. The resin film 20 which has such reinforcing bars 23 may be formed by punching a given rectangular synthetic resin film so as to leave the reinforcing bars 23. It should be noted that the reinforcing bars 23 are not necessarily to extend horizontally, but may otherwise extend, for example, vertically or diagonally. Further, it is not essential to form the reinforcing bars 23, and it may not be eliminated depending on the rigidity or shape of the resin film 20.

The MEA component 22 may be formed as discussed in JP-A-11-45729, for example. First, the membrane/electrode assembly 18 is formed by adhering the fuel electrode 16a and the oxidant electrode 16b to either side of solid polymer membrane 14. Then, two resin films 20 are superposed on either side of the projecting portion 19 of the solid polymer membrane 14 projecting outwards beyond the fuel electrode 16a and the oxidant electrode 16b in a sandwich fashion, and heat welded thereon, thereby producing the MEA component 22. The two resin films 20 are integrally bonded by welding to form the single resin film 20.

A pair of first and second separators 24, 26 are superposed on each other with the MEA component 22 interposed therebetween. In the present embodiment, the first separator 24 is superposed on the fuel electrode 16a side, and the second separator 26 is superposed on the oxidant electrode 16b side. As is understood from FIGS. 4-6, identical metal separators 28 are employed as the first separator 24 and the second separator 26.

The metal separator 28 may be formed of a metal material that, in addition to having good conductivity, has effective rigidity and corrosion resistance in oxidizing environments. For instance, a stainless steel base material, optionally subjected to a surface treatment or used as a composite material with carbon or the like, to achieve the required characteristics at a high level. In order for the metal separator 28 to have the required rigidity and machining precision, it is formed by means of pressing, using a flat metal plate with generally uniform thickness (e.g. thickness of about 0.1 mm-0.5 mm). In the present embodiment, the metal separator 28 is formed of a metal plate of about 0.2 mm thickness.

Specifically, the metal separator 28 has equal numbers of through-holes 34a-34h formed by punching and located at a first side edge 30 and a second side edge 32 (in this embodiment, four on each side) which are situated on the same side when the unit cell 12 is assembled. The four through-holes 34e, 34a, 34c, 34f on the first side edge 30 and the four through-holes 34g, 34d, 34b, 34h on the second side edge 32 are formed with mutually symmetrical shape and locations. That is, when the metal separator 28 is inverted front to back about a center axis that is either a horizontal center axis extending on the horizontal through the center in the height direction of the metal separator 28 or a plumb-bob vertical axis extending vertically through the center in the lateral direction, the total of eight through-holes 34a-34h will be positioned at the same locations of the side edges on the left and right sides. At the first side edge 30, the through-holes 34e, 34a, 34c, 34f are formed in that order from the top, and at the second side edge 32 the through-holes 34g, 34d, 34b, 34h are formed in that order from the top.

With this arrangement, even when the two metal separators 28, 28 are superposed inverted front to back, the three through-holes formed in each of the left and right edges will align and communicate with one another in the stacking direction. In this embodiment, the through-holes 34a-34h respectively constitute a fuel gas feed port 36a, a fuel gas discharge port 36b, an oxidant gas feed port 36c, an oxidant gas discharge port 36d, coolant feed ports 36e, 36f and coolant discharge ports 36g, 36h.

The metal separator 28 has a primary face 38 to be superposed against the fuel electrode 16a. On the central area of the primary face 38, there are formed a plurality of primary-face grooves 40 extending in the horizontal direction while being generally parallel to each other, preferably at a given intervals. Preferably, a plurality of projecting support portions 42 each extending parallel to the primary-face grooves 40 are arranged on the central area of the primary face 38 at a predetermined interval greater than the intervals of the grooves 40, so that the primary-face grooves 40 are divided into several groups separated from one another in the vertical direction by means of the projecting support portions 42 interposed therebetween. In the present embodiment, the primary-face grooves 40 are divided by projecting support portions 42 every ten. Forty primary-face grooves 40 in total are divided into four groups by means of three projecting support portion 42. The intervals between the projecting support portions 42 are determined so that the reinforcing bars 23 of the resin film 20 will be superposed on the projecting support portions 42 in the state where the MEA component 22 is superposed against the metal separator 28. In the same state, openings of the primary-face grooves 40 are covered by the fuel electrodes 16a or the oxidant electrodes 16b.

In this embodiment in particular, each primary-face grooves 40 has a cross section of generally isosceles trapezoidal shape gradually constricting in width towards the bottom. Preferably, the primary-face groove 40 should have width of from 1.0 mm to 2.0 mm at the mouth, and from 0.5 mm to 1.5 mm at the bottom, and depth of from 0.3 mm to 1.2 mm. More preferably, it will have width of 1.6 mm at the mouth, width of 1.0 mm at the bottom, and depth of 0.7 mm. The interval between neighboring primary-face grooves 40 will preferably be from 0.2 mm to 1.2 mm at the mouth, and more preferably 0.7 mm.

The primary face 38 of the metal separator 28 further includes a pair of gas-reserving zones 44 formed between the through holes 34a-34h and one ends of the primary-face grooves 40. The gas-reserving zones 44 extend in the vertical direction and connect with one-side ends of the primary-face grooves 40. Each gas-reserving zone 44 includes a deep portion vertically extending with the same depth dimension as the primary-face grooves 40, and a shallow portion with a depth dimension smaller than that of the deep portion, at least. These gas-reserving zones 44 are surrounded by a primary-face sealing rubber layer 54, which will be described later.

Additionally, the primary face 38 of the metal separator 28 further includes connecting grooves 46 that connect the through holes 34a, 34d and the gas-reserving zone 44, respectively. Each connecting groove 46 has the generally same depth dimension as the primary-face grooves 40, and extends inwardly in the generally horizontal direction from one end connected with the through hole 34a/34b, with the other end connected with the gas-reserving zone 44. In the vicinity of the one end of the connecting groove 46 that connects with the through hole 34a/34b, there is formed a stepped portion 48 having a depth dimension smaller than that of the other part of the connecting groove 46, while extending over the entire widthwise dimension of the connecting groove 46. In the vicinity of the other end of the connecting groove 46 that connects with the gas-reserving zone 44, there are formed several support projections 50 projecting out from the bottom of the connecting groove 46 with a given lengthwise dimension. In the present embodiment, the several support projections 50 are arranged at regular intervals while being parallel to one another. It should be noted that the stepped portion 48 and the support projections 50 are not necessarily required to practice the present invention, and may be employed in a variety of shapes and/or the number. For example, the support projection 50 may be formed in the pillar form, a generally truncated conical shape, truncated pyramid form, etc. Alternatively, the support projection 50 may be distributed over the entire area of the connecting groove 46.

In the primary face 38 of the metal separator 28, the areas of the primary-face grooves 40 and the gas-reserving zones 44 will be superposed on the MEA component 22, thereby providing a gas diffusion zone 52 to which the fuel gas or oxidant gas is fed.

Figure 4:
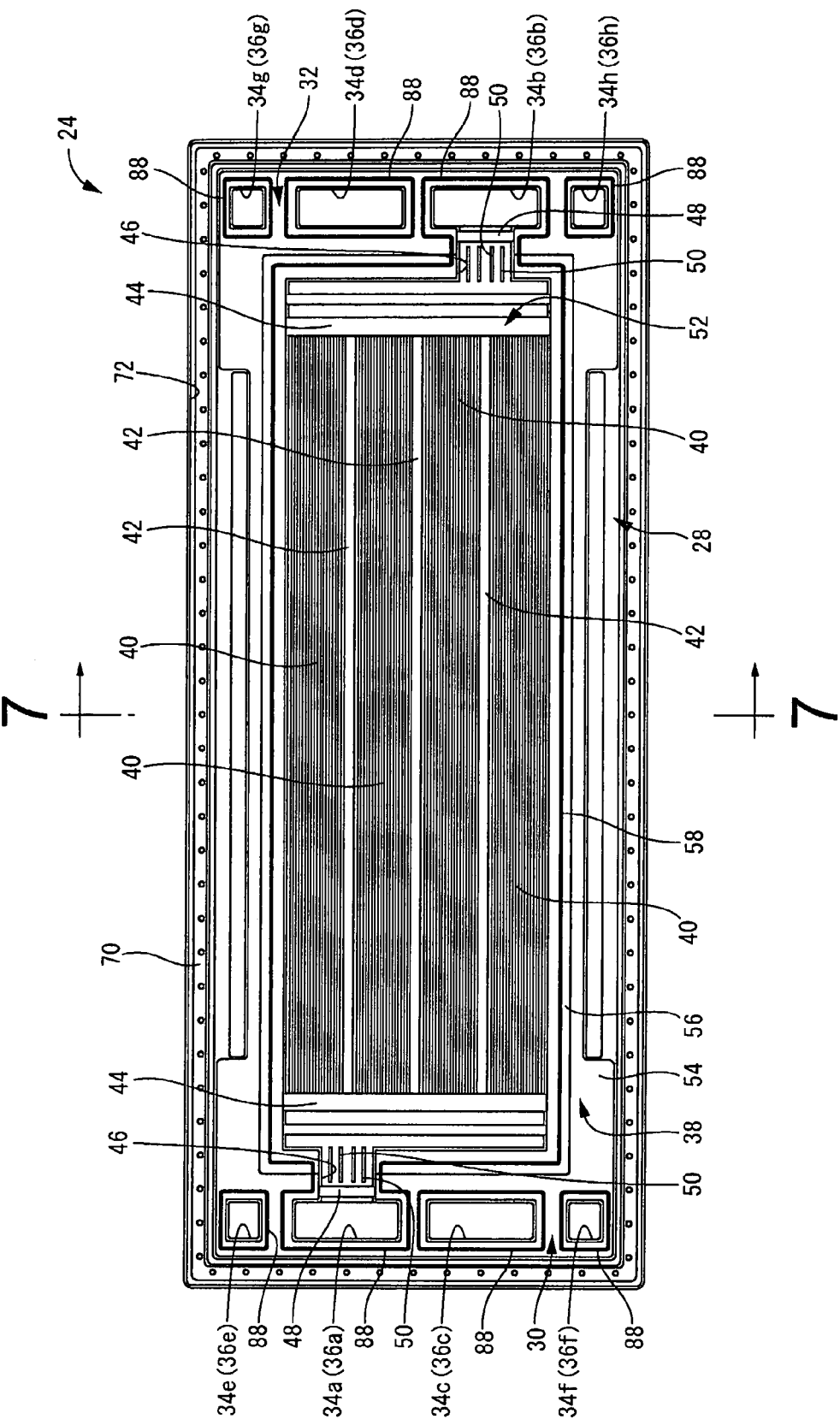
FIG. 4 is a front elevational view of the primary face of a first separator of the unit cell of FIG. 1.
Figure 5:
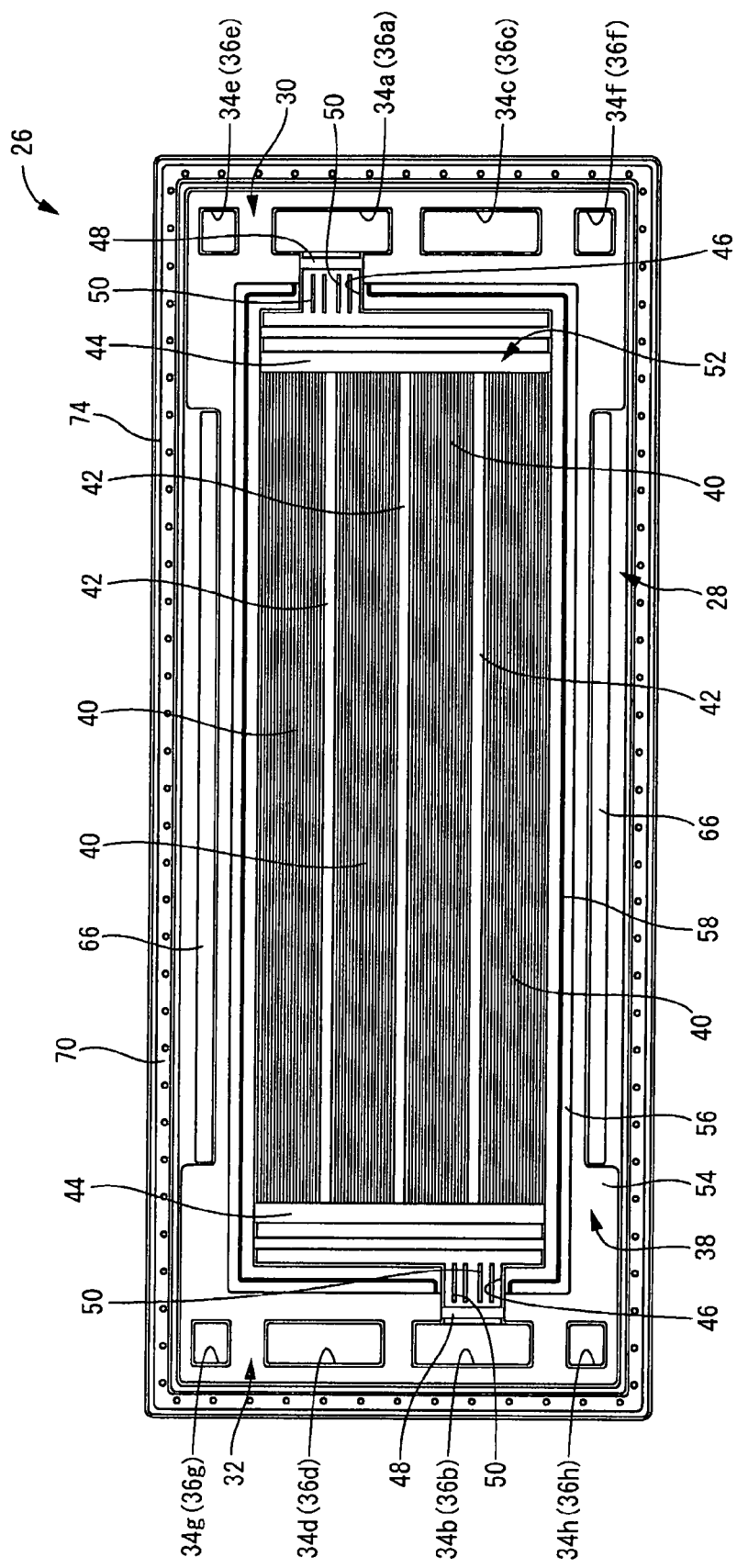
FIG. 5 is a front elevational view of the primary face of a second separator of the unit cell of FIG. 1.

As will be understood from FIGS. 4 and 5, on the primary face 38 of the metal separator 28, there is formed in a bonded fashion a primary-face sealing rubber layer 54 so as to surround the fuel gas feed/discharge ports 36a, 36b, the oxidant gas feed ports 36c, 36d, and yet the gas diffusion zone 52. In this embodiment, the primary-face sealing rubber layer 54 is bonded by vulcanization with its entire surface on the primary face 38 of the metal separator 28 so that it is held in close contact against the metal separator 28 with fluid-tight sealing.

An inner peripheral portion of the primary-face sealing rubber layer 54 has a wall thickness smaller than that of the outer peripheral portion. This small thickness inner peripheral portion serves as a MEA sealing rubber layer 56. The MEA sealing rubber layer 56 is formed with a given width dimension over a substantially all the way around the gas diffusion zone 52, except the portion where the connecting grooves 46 are formed. On the MEA sealing rubber layer 56, the resin film 20 of the MEA component 22 will be superposed. The MEA sealing rubber layer 56 includes an MEA sealing ridge 58 integrally formed therewith. The MEA sealing ridge 58 continuously extends with a generally constant semi-circular cross sectional shape along the gas diffusion zone 52, and bend before the connecting grooves 46 to the outside along the connecting grooves 46. In the present embodiment, the projecting end of each projecting support projection 50 formed on the bottom of the connecting groove 46 is coplanar with the top face of the MEA sealing rubber layer 56.

Figure 6:
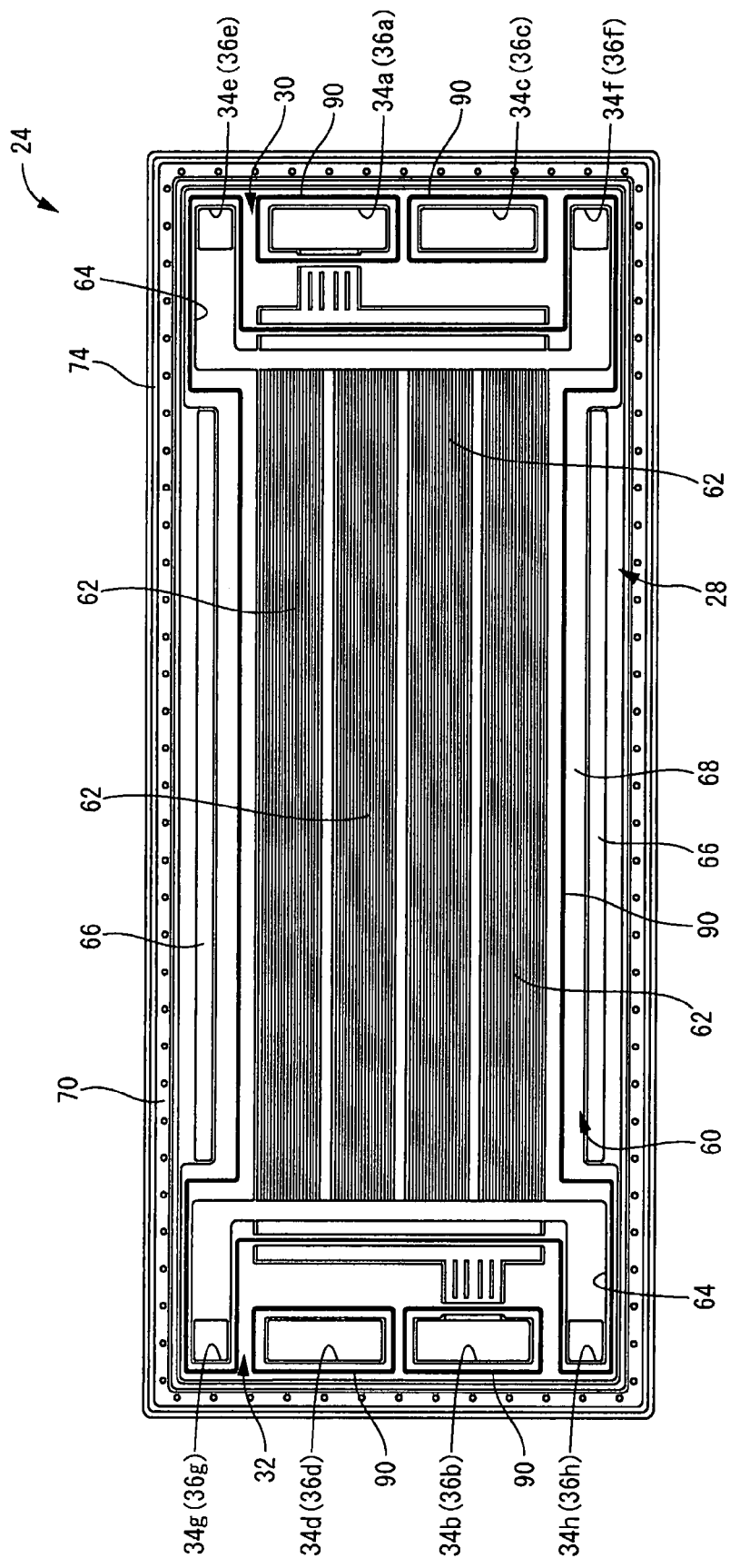
FIG. 6 is a front elevational view of the secondary face of the first and second separators of FIGS. 4 and 5.

On the secondary face 60 of the metal separator 28 on the opposite side thereof from the primary face 38 onto which the primary-face grooves 40 open, there is formed secondary-face grooves 62, as shown in FIG. 6. The secondary-face grooves 62 are formed opening on the secondary face 60 between the primary-face grooves 40 formed on the primary face 38, and extend straightly in the horizontal direction. That is, the land portions between the primary-face grooves 40 on the primary face 38 are utilized as the secondary-face grooves 62 on the secondary face 60 on the opposite side.

The secondary-face grooves 62 are connected with the through holes 34e-34h, by utilizing a part of the secondary face 60 side of the gas-reserving zone 44 formed on the primary face 38. That is, a connecting groove 64, which is connected with the ends of the secondary-face grooves 62, is constituted by incorporating the part on the secondary face 60 side corresponding to the connecting portion between the gas-reserving zone 44 and the primary-face grooves 40 on the primary face 38 side. This connecting groove 64 is formed by surrounding the desired portion with a secondary-face sealing rubber layer (which will be described later).

On the secondary face 60 of the metal separator 28, there is formed a pair of conducting contact parts 66 at portions located vertically both ends thereof and outside the zone forming the secondary-face grooves 62. These conducting contact parts 66 project on the side of the secondary face 60, while straightly extending in the horizontal direction with a length slightly smaller than that of the secondary-face grooves 62. With the plurality of unit cells 12 stacked on one another, the conducting contact parts 66 of the respective metal separators 28 are mutually held in contact on their secondary face 60 sides. In the present embodiment, the conducting contact parts 66 are formed by pressing predetermined portions of the metal separator 28 in order to project toward the secondary face 60 side. It should be noted that the conducting contact parts 66 are not essential to practice the present invention, and no limitation exists on the arrangement, the number or the like of the conducting contact parts 66.

On the secondary face 60 of the metal separator 28, there is formed in a bonded fashion a secondary-face sealing rubber layer 68 that surrounds the area where the secondary-face grooves 62 are formed. This secondary-face sealing rubber layer 68 is formed avoiding the area which conducts current between unit cells 12 in the voltage generated by each unit cell 12 at the state of stacking of unit cells 12 and direct contact of mutual metal separators 28, e.g., the conducting contact parts 66, the projections between the secondary-face grooves 62, the connecting groove 46 on the secondary face 60 side, and the deep portion of the gas-reserving zones 44 on the secondary face 60 side. Further, the secondary-face sealing rubber layer 68 is formed avoiding the portions where the connecting grooves 64 are formed for connecting the through holes 34e-34h and the secondary-face grooves 62. With this arrangement, there are formed the connecting grooves 64 recessed from the surface of the portion where the secondary-face sealing rubber layer 68 is bonded, by a dimension corresponding to the thickness of the secondary-face sealing rubber layer 68.

Moreover, a separator reinforcing member 70, which is formed with a rigid synthetic resin material, is affixed to the outer peripheral edge of the metal separator 28. The separator reinforcing member 70 has a frame body shape with a thick sufficiently larger than the plate thickness dimension of the metal separator 28, and bonded continuously all the way around the outer peripheral portion of the metal separator 28. The provision of the separator reinforcing member 70 makes it possible to reinforcing the metal separator 28 to thereby prevent its deformation. In addition, by setting up suitably the thickness dimension (dimension in the direction of juxtaposition of the separators) of separator reinforcing member 70, the projecting distal end faces of conducting contact parts 66, tips of projections formed between secondary-face grooves 62, and bottoms of the connecting grooves 46 on the secondary face 60 side, deep portions of the gas-reserving zones 44 on the secondary face 60 side, and the like can be coplanar with or slightly project from the surface of the separator reinforcing members 70 on the secondary face 60 side.

Further, on the primary face 38 side of the first separator 24, a fitting groove 72 of slot shape extending with a generally constant semi-circle cross section is formed on the separator reinforcing member 70, while on the secondary face 60 side, there is formed on the separator reinforcing member 70 a fitting projection 74 that projects with a semi-circle cross section corresponding to the shape of the fitting groove 72. With respect to the second separator 26, on the other hand, the fitting projection 74 is on the primary face 38 side, and the fitting groove 72 is formed on the secondary face 60 side. These fitting grooves 72 and fitting projections 74 are shaped to be mutually mated together. Thus, the fitting groove 72 of the first separator 24 and the fitting projection 74 of the second separator 26 are mutually aligned and mated together on the primary face 38 side, while the fitting projection 74 of the first separator 24 and the fitting groove 72 of the second separator 26 are mutually aligned and mated together on the secondary face 60 side. According to this arrangement, by utilizing the separator reinforcing member 70 for reinforcing the metal separator 28, the alignment of the first and second separators 24, 26 can be easily realized, resulting in high efficiency in assembling operation of the first and second separators 24, 26. For this purpose, while it is preferable to utilize the separator reinforcing member 70, it is not essential for the present invention to employ the separator reinforcing member 70. The shape, number and arrangement of the fitting groove 72 and fitting projection 74 are not limited to those of this embodiment. A plurality of fitting grooves 72 and fitting projections 74 may be arranged at the respective positions while extending along with one another. Alternatively, a pair of the fitting groove 72 and fitting projection 74 may be provided on one face of the separator reinforcing member 70.

The separator reinforcing member 70 can be effectively molded by injecting a synthetic resin material into a mold wherein the metal separator 28 is set. Preferably, the mold includes holding portions for gripping the metal separator 28 from both of the primary face 38 side and the secondary face 60 side, thereby preventing deformation of the metal separator 28 due to pressure generated upon injection molding of the separator reinforcing member 70. That is, in the present embodiment, the injection molding of the separator reinforcing member 70 with the metal separator 28 being held by means of the holding portions of the mold. Accordingly, as seen in FIG. 4-7, a plurality of tiny holes are formed at portions where the holder portions of the mold were held in contact with the metal separator 28, and through the plurality of tiny holes, the metal separator 28 is exposed to the outside.

Figure 7:
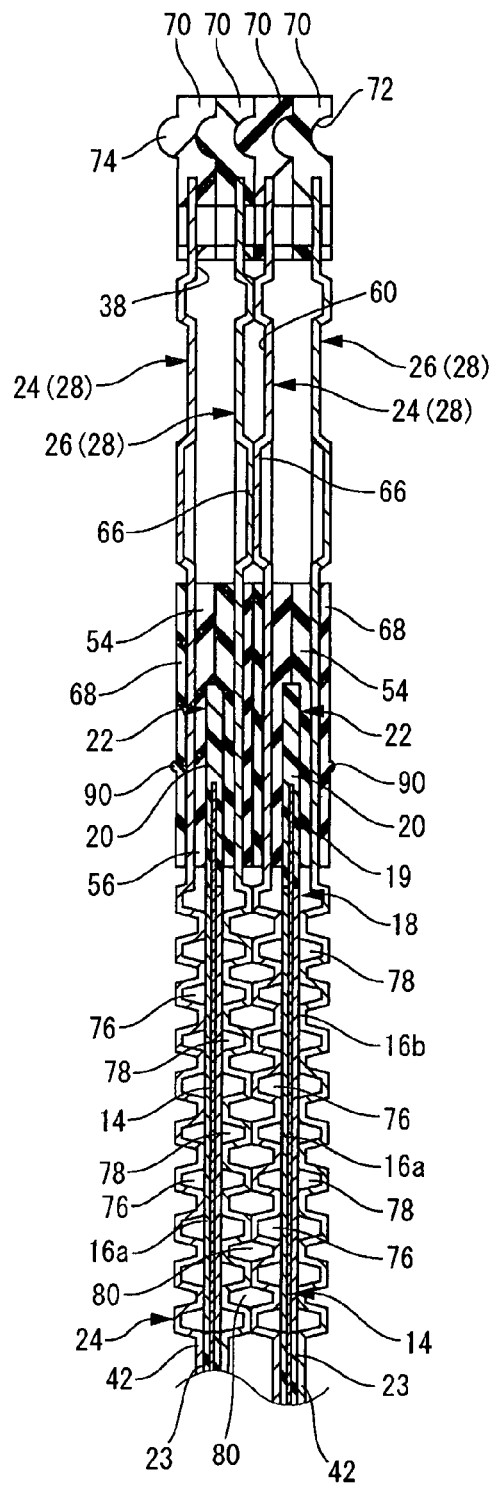
FIG. 7 is a fragmentary view of a cross sectional view taken along line 7-7 of FIG. 4.

The MEA component 22 is sandwiched from either side by the first and second separators 24, 26 used as the two metal separators 28, thereby forming the unit cell 12 with the primary faces 38 of the first and second separators 24, 26 held in contact with either side of the MEA component 22. As shown in FIG. 7, the openings of the primary-face grooves 40 of the first separator 24 are closed by the fuel electrode 16a, whereby there are formed, between superimposed faces of the first separator 24 and the fuel electrode 16a, fuel gas flow passages 76 of tunnel shape for feeding fuel gas (hydrogen). Further, the openings of the primary-face grooves 40 of the second separator 26 are closed by the oxidant electrode 16b, whereby there are formed, between superimposed faces of the second separator 26 and the oxidant electrode 16b, oxidant gas flow passages 78 of tunnel shape for feeding oxidant gas (air). In the present embodiment, since the fuel gas flow passages 76 and the oxidant gas flow passages 78 are formed by using the primary-face grooves 40, so that these passages 76, 78 extend straightly in the horizontal direction. Accordingly, the fuel gas and the oxidant gas flow through the fuel gas flow passages 76 and the oxidant gas flow passages 78 are fed with stability without a problem of local pressure variation. In the present embodiment, additionally, the fuel gas flow passages 76 and the oxidant gas flow passages 78 are held in communication with the fuel gas and oxidant gas feed/discharge ports 36a-d via the gas-reserving zones 44, respectively, so that the fuel/oxidant gas supplied from the gas supply port 36a/36c is temporality reserved in the gas-reserving zone 44 and is then fed into the fuel gas/oxidant gas flow passage 76/78. This makes it possible to supply with stable pressure the fuel/oxidant gas into the plurality of fuel gas/oxidant gas flow passage 76/78.

In the unit cell 12 of stacking structure of the MEA component 22 and the first and second separators 24, 26 superposed on either side of the MEA component 22, the reinforcing bars 23 formed on the resin film 20 of the MEA component 22 are held in contact with the projecting support portions 42 formed in between the primary-face grooves 40 of the first and second separators 24, 26. With this arrangement, the outer peripheral edge of the resin film 20 is sandwiched between and clamped by respective MEA sealing rubber layers 56 of the first and second separators 24, 26, while the intermediate portion of the resin film 20 is partially forcedly gripped between the respective projecting support portions 42 of the first and second separators 24, 26. As a result, the bending modification and other deformation of the MEA component 22 as well as the resin film 20 are effectively prevented.

Between adjacent two of unit cells 12 mutually stacked to constitute the cell stack, coolant flow passages 80 for feeding cooling water are formed between mutually superposed faces of the first separator 24 of the one unit cell 12 and the second separator 26 of the other unit cell 12. More specifically, the secondary-face grooves 62 on the secondary face 60 of the first separator 24 and the secondary-face grooves 62 on the secondary face 60 of the second separator 26 are mutually superposed on each other so that openings of the secondary-face grooves 62 on both of the first and second separators 24, 26 are closed by opposing grooves 62, thereby forming the coolant flow passages 80 between mutually opposed inside faces of the secondary-face grooves 62.

In each unit cell 12, the fuel gas feed port 36a, the fuel gas discharge port 36b, the oxidant gas feed port 36c, and the oxidant gas discharge port 36d are formed perforating in the stacking direction at intermediate portion of each of the first side edge 30 and the second side edge 32 which are horizontally opposed to each other as seen in the installation state of the solid polymer electrolyte fuel cell 10. In particular, the fuel gas feed port 36a and the fuel gas discharge port 36b are arranged to be approximately opposed to each other in one diagonal direction, while in another diagonal direction, the gas feed port 36c and the oxidant gas discharge port 36d are arranged to be approximately opposed to each other. At the vertically upper and lower portions of each of the first and second side edges 30, 32 of each unit cell 12, there are formed perforating in the stacking direction the coolant feed ports 36e, 36f and the coolant discharge ports 36g, 36h. It should be noted that the fuel gas feed port 36a and the fuel gas discharge port 36b are held in communication through the fuel gas flow passage 76, while the oxidant gas feed port 36c and the oxidant gas discharge port 36d are held in communication through the oxidant gas flow passage 78. Further, the coolant feed ports 36e, 36f and the coolant discharge ports 36g, 36h are mutually held in communication through the coolant flow passage 80. In this embodiment, the first and second separators 24, 26 used as the two metal separators 28 for stacking against either side of the MEA component 22 are assembled flipped front to back with respect to one another. That is, on the first separator 24 side, the fuel gas flow passages 76 formed with the primary-face grooves 40 connect the fuel gas feed port 36a and the fuel gas discharge port 36b together, while on the second separator 26 side, the oxidant gas flow passages 78 formed with the primary-face grooves 40 connect the oxidant gas feed port 36c and the oxidant gas discharge port 36d together.

While not shown in the drawings, the solid polymer electrolyte fuel cell 10 includes an anode collector and a cathode collector, which are superposed on the front unit cell 12 and the rear unit cell 12 in the stacking direction, respectively, as disclosed in JP-A-2002-83610, for example. Thus, the total voltage produced by the plurality of unit cells 12 mutually connected in series can be drawn out via the anode collector and the cathode collector. In the present embodiment, the conducting contact parts 66 formed on the secondary face 60 sides of the first and second separators 24, 26 are brought into contact together, and the first separator 24 and the second separator 26 are directly held in contact with each other at portions including the conducting contact parts 66, making the unit cells 12 electrically conductive mutually. Further, an anode retainer plate 82 and a cathode retainer plate 84 are superposed on the outside faces of the anode collector and cathode collector, via suitable insulating spacers (not shown). As well known in the art, the entire components including the plurality of unit cells 12, the anode and cathode collectors, as well as the anode and cathode retainer plates 82, 84, are banded together at their four corners in the stacking direction, by means of the fastening bolts extending therethrough, thereby providing the solid polymer electrolyte fuel cell 10.

In the solid polymer electrolyte fuel cell 10, a fuel gas feed port 86a, a fuel gas discharge port 86b, an oxidant gas feed port 86c, an oxidant gas discharge port 86d, coolant feed ports 86e, 86f, and coolant discharge ports 86g, 86h, for a total of eight ports 86a-86h, are formed in the anode retainer plate 82 and cathode retainer plate 84. These ports 86a-86h connect to the corresponding apertures of the fuel gas, oxidant gas, and coolant feed and discharge ports 36a-36h formed communicating with one another in the plurality of stacked unit cells 12. External lines (not shown) are connected to the ports 86a-h so that fuel gas, oxidant gas, and coolant can be supplied to and discharged from the fuel gas, oxidant gas, and coolant feed and discharge ports 36a-36h.

The fuel gas, oxidant gas, and coolant supplied to the feed ports 36a, 36c, 36e, 36f through the feed ports 86a, 86c, 86e, 86f flow through the fuel gas flow passage 76 and the oxidant gas flow passage 78 formed in the unit cell 12 described above, and through the coolant flow passage 80 formed between unit cells 12, 12, and then through the discharge ports 36b, 36d, 36g, 36h, to be discharged through the discharge ports 86b, 86d, 86g, 86h.

By so doing, as in the known art, in the fuel electrode 16a disposed on the first separator 24 side of the solid polymer membrane 14, the supplied fuel gas is ionized through catalyst action to supply electrons, while in the oxidant electrode 16b disposed on the second separator 26 side of the solid polymer membrane 14, hydrogen ions transported through the solid polymer membrane 14 react with oxidant gas (air) supplied from the outside and electrons fed back via an external electrical circuit, to produce water vapor, thereby functioning overall as a battery that exhibits power generating action.

In order to efficient exhibit the desired power generating action, it is necessary to react fuel gas and oxygen gas supplied continuously to the unit cells 12 with each other with no leakage to the outside through the gas flow passages 76, 78 (including the gas diffusion zone 52 and the connecting grooves 46), thereby facilitating the power generating action.

In the present embodiment, on the primary face 38 of the metal separator 28, there is formed in a bonded fashion the primary-face sealing rubber layer 54 (MEA sealing rubber layer 56) so as to surround the gas diffusion zone 52 and through holes 34a-34h. Further, the openings of the connecting grooves 46 are closed by means of the MEA component 22 (resin film 20) and the other metal separator 28 as of the component of the unit cell 12, thereby providing tunnel passages for connecting the gas flow passages 76, 78 and the gas feed/discharge ports 36a-36d, respectively.

That is, the primary-face sealing rubber layer 54 is a thin rubber layer disposed surrounding with a generally constant thickness the gas diffusion zone 52 and through holes 34a-34h. At the inner peripheral portion of the primary-face sealing rubber layer 54, the MEA sealing rubber layer 56 is integrally formed over the substantially all the way around the gas diffusion zone 52, except the portion where the connecting grooves 46 are formed. This MEA sealing rubber layer 56 has a shape corresponding to the outer peripheral edge portion of the MEA component 22, so that the outer peripheral edge portion of the MEA component 22 is superposed against the MEA sealing rubber layers 56 of the first and second separators 24, 26, over the approximately entire circumference. The MEA sealing rubber layer 56 is thinner than the primary-face sealing rubber layer 54, depending on the thickness of the MEA component 22. In the present embodiment, for example, the MEA sealing rubber layer 56 of each of the first and second separators 24, 26 is thinner than the primary-face sealing rubber layer 54, by a generally half of the thickness of the MEA component 22, so that the MEA component 22 is sandwiched and disposed between the MEA sealing rubber layers 56 of the first and second separators 24, 26. Since the shape of the MEA sealing rubber layer 56 corresponds to the outer peripheral edge of the MEA component 22, the MEA components 22 can be disposed in position so as to be parallel to the faces between the first separator 24 and the second separator 26. With this arrangement, the spaces between the first and second separators 24, 26 and the MEA sealing rubber layer are fluid-tightly closed by means of the MEA sealing rubber layer 56, thereby preventing deterioration or instability of power generating capability due to leakage of the fuel gas and/or the oxidant gas.

In the present embodiment, further, the MEA sealing ridge 58 is integrally formed on the central portion in the widthwise direction of the MEA sealing rubber layer 56 over the generally entire circumference thereof. With the MEA component 22 interposed between the first and second separators 24, 26, the MEA sealing ridges 58 of the first and second separators 24, 26 are forcedly pressed on either face of the MEA component 22, making it possible to ensure a gas sealing between the MEA component 22 and the first and second separators 24, 26, effectively.

Figure 8:
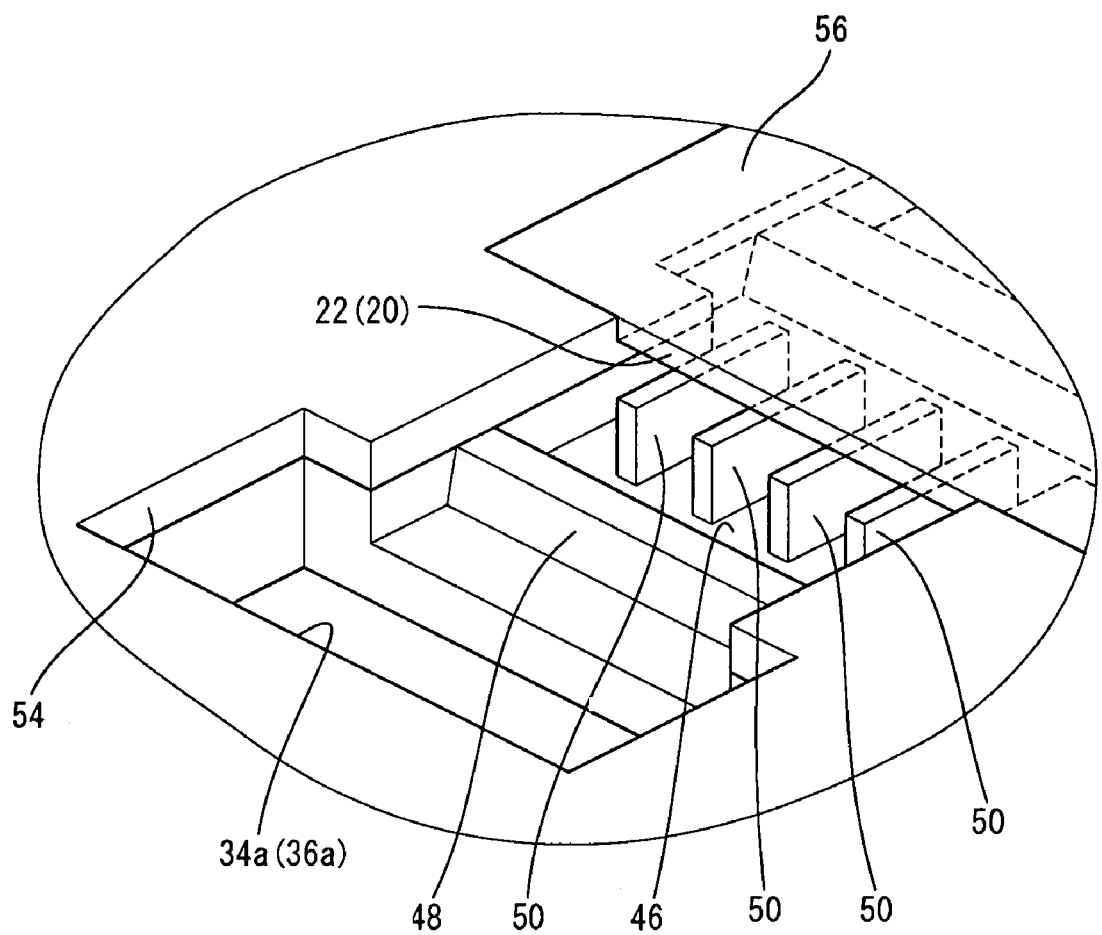
FIG. 8 is a fragmentary perspective view showing a primary part of the unit cell of FIG. 2.

As shown in FIG. 8, the MEA component 22 is positioned with respect to the first and second separators 24, 26 such that at least a part of the resin film 20 formed at the outer peripheral edge of the MEA component 22 is located on the respective connecting grooves 46 of the first separator 24 and the second separator 26. By means of this arrangement, the openings of the connecting grooves 46 on the primary face 38 side is closed by the outer peripheral edge of the MEA component 22, thereby forming tunnel flow passages. Thus, the leakage of the fuel gas and the oxidant gas at the connecting portions between the gas feed/discharge ports 36a-36d and the gas flow passages 76, 78 can be effectively prevented. The outer peripheral portion of membrane/electrode assembly 18 is especially reinforced with the rigid resin film 20 formed as extended in the perimeter side in membrane/electrode assembly 18. Further, the rigid resin film 20 is disposed as bridging the openings of the connecting grooves 46, whereby the connecting portions between the gas flow passages 76, 78 and the gas feed/discharge ports 36a-36d are formed as tunnel flow passages. In comparison with the case when covering connecting grooves 46 by membrane/electrode assembly 18 which is not equipped with resin film 20, the present embodiment can effectively prevent the deformation of the MEA component 22 by the pressure of the gas fed through the unit cell 12 to thereby form a gap between the MEA component 22 and the MEA sealing rubber layer 56, and accordingly prevent invading of the gas into the opposite side of the MEA component 22 through the gap.

In the present embodiment, the support projections 50 are formed so as to project out from the bottom of connecting groove 46. As shown in FIG. 8, since the projection tips of the support projections 50, and the surface of the MEA sealing rubber layer 56 are coplanar with each other, the support projections 50 are brought into contact with the resin film 20 of the MEA component 22. With this arrangement, the MEA component 22 is supported by the support projections 50, thereby effectively maintaining the tunnel structure of the flow passage defined by the connecting groove 46 and the MEA component 22. In the present embodiment, the several support projections 50 extend with a given length in the lengthwise direction of the connecting groove 46 (horizontal direction), while being arranged at given intervals in the widthwise direction of the connecting groove 46. With this arrangement, the support projections 50 can effectively support the MEA component 22 with stability.

On the primary-face sealing rubber layer 54 of the first separator 24, the primary-face sealing ridge 88 is formed over an approximately entire circumference of each of the through holes 34a-34h. On the other hand, the primary-face sealing rubber layer 54 of the second separator 26 is made flat at portions to which the primary-face sealing ridges 88 are forcedly pressed when the first and second separators 24, 26 are superposed on each other. Therefore, when the first and second separators 24, 26 are superposed on each other, the primary-face sealing ridges 88 of the first separator 24 is forcedly pressed against the flat portions of the primary-face sealing rubber layer 54 of the second separator 26, thereby ensuring fluid-tight sealing between the first and second separators 24, 26. Further, the use of the flat portions of the primary-face sealing rubber layer 54 of the second separator 26, permits desired sealing between the first and second separators 24, 26 without needing precise positioning of the first and second separators 24, 26 in their surface extending direction.

On the secondary-face sealing rubber layer 68 of the first separator 24, the secondary-face sealing ridge 90 is integrally formed over an approximately entire circumference of each of the secondary-face grooves 62, the connecting grooves 64 and the through holes 34a-34h. On the other hand, the secondary-face sealing rubber layer 68 of the second separator 26 has a constant thickness over its entire area so that its surface is made flat. This arrangement makes it possible to effectively prevent leakage of the cooling water flowing between the adjacent unit cells 12 and to ensure a sufficient flowing of the cooling water, without needing precise positioning of the first and second separators 24, 26. Therefore, the solid polymer electrolyte fuel cell 10 can be maintained to the initial preset temperature, permitting stabilize and efficient power generation.

While the presently preferred embodiments of this invention have been described in detail, for illustrative purpose only, it is to be understood that the present invention is not limited to the details of the illustrated embodiments.

For instance, the shapes and positions of the fuel gas feed/discharge ports 36a, 36b, the oxidant gas feed/discharge ports 36c, 36d, and the coolant feed/discharge ports 36e-36h are not limited to the specific illustrations in the illustrated embodiments. While the shapes of the fuel gas/oxidant gas flow passages 76, 78 and the coolant flow passages 80 in the illustrated embodiment are preferable in order to realize smooth supply of gas and cooling water, there is no need to be limited to the illustrated ones. For example, while setting the through hole formed in the upper end portion of the first side edge 30 as a fuel gas feed port, a fuel gas discharge port is prepared in the lower end portion of second side edge 32. While preparing an oxidant gas feed port in the lower end portion of first side edge 30, the oxidant gas discharge port is prepared in the upper end portion of second side edge 32. Further, you may form a coolant feed port and a coolant discharge port in the central part of first side edge 30 and second side edge 32, respectively. Then, the gas supply port and the gas discharge port may be connected by a gas flow passage formed using a primary-face groove, which moves in a zigzag direction. The secondary grooves are formed by using the projections formed between the primary face grooves on the secondary-face side, and the secondary grooves is utilized to form the coolant flow passages. With this coolant flow passages, the coolant feed port and coolant discharge port may be connected.

It is also to be understood that the present invention may be embodied with various other changes, modifications and improvements, which may occur to those skilled in the art, without departing from the spirit and scope of the invention defined in the following claims.

What is claimed is:

1. A unit cell for use in a solid polymer electrolyte fuel cell comprising:
   a membrane/electrode assembly including a fuel electrode and an oxidant electrode disposed on either side of a solid polymer electrolyte membrane, the assembly being sandwiched from either side by a first separator and a second separator to give a stacked construction;
   a fuel gas flow passage formed between opposed faces of the fuel electrode and the first separator; and
   an oxidant gas flow passage formed between opposed faces of the oxidant electrode and the second separator,
   wherein the solid polymer electrolyte membrane in the membrane/electrode assembly has a planar shape slightly larger than the fuel electrode and the oxidant electrode so that an entire perimeter of an outer peripheral edge portion of the solid polymer electrolyte membrane forms a projecting portion projecting outwardly beyond outer peripheral edges of the fuel electrode and the oxidant electrode, and the projecting portion of the solid polymer electrolyte membrane is coated by a reinforcing resin member affixed thereto,
   wherein the first separator has a primary-face sealing rubber layer affixed onto a primary face thereof so that the reinforcing resin member is stacked on the first separator via the primary-face sealing rubber layer, and connecting grooves formed on the primary face thereof for connecting both ends of the fuel gas flow passage with a fuel gas feed /discharge ports respectively, which are formed perforating through the first separator,
   wherein the second separator has a primary-face sealing rubber layer affixed onto a primary face thereof so that the reinforcing resin member is stacked on the second separator via the primary-face sealing rubber layer, and connecting grooves formed on the primary face thereof for connecting both ends of the oxidant gas flow passage with an oxidant gas feed/discharge ports respectively, which are formed perforating through the second separator,
   wherein the reinforcing resin member is placed so as to bridge openings of the connecting grooves in order to give a tunnel construction to the connecting grooves, and
   wherein each connecting groove includes at least one supporting projection projecting upward from a bottom face of the connecting groove, and a portion of the reinforcing resin member extending across the opening of the connecting groove is held in contact with and supported by the supporting projection.

2. The unit cell according to claim 1, wherein the reinforcing resin member includes at least one reinforcing bar, the fuel electrode and the oxidant electrode include a plurality of electrode segments divided by the reinforcing bar.

3. The unit cell according to claim 1, wherein each connecting groove includes a plurality of supporting projections each extending continuously with a given length in a lengthwise direction of the connecting groove, the supporting projections are arranged in a widthwise direction of the connecting groove while being spaced away from one another.

4. The unit cell according to claim 1, wherein the fuel gas flow passage and the oxidant gas flow passage extend straightly with both ends connected respectively with pairs of gas-reserving zones extending in a widthwise direction of the fuel gas flow passage and the oxidant gas flow passage, respectively, while the pairs of gas-reserving zones are respectively connected to the fuel gas feed/discharge ports and the oxidant gas feed/discharge port so that a fuel gas and an oxidant gas are reserved temporarily within the gas-reserving zones.

5. The unit cell according to claim 1, wherein the primary-face sealing rubber layer is arranged for surrounding at least perimeters of zones forming the fuel gas flow passage and the oxidant gas flow passage respectively, as well as the fuel gas feed/discharge ports and the oxidant gas feed/discharge ports respectively, and wherein the primary-face sealing rubber layer includes an MEA sealing ridge integrally formed at a portion to be superposed on the reinforcing resin member that projects outward in a superposing direction and is formed continuously.

6. The unit cell according to claim 1, wherein the primary-face sealing rubber layer affixed onto the primary face of the first separator includes a primary-face sealing ridge of continuous projection arranged for surrounding the fuel gas feed/discharge ports and the oxidant gas feed/discharge ports respectively, while the primary-face sealing rubber layer affixed onto the primary face of the second separator has a planar surface at a portion on which the primary-face sealing ridge is superposed.

7. The unit cell according to claim 1, wherein each of the first separator and the second separator includes a separator reinforcing member affixed to an entire outer peripheral edge thereof, and one of a fitting groove and a fitting projection is formed on a surface of the separator reinforcing member of one of the first and second separators, while the other of the fitting groove and the fitting projection is formed on a surface of the separator reinforcing member of the other of the first and second separators so that the separator reinforcing members are superposed on each other by means of mating between the fitting groove and the fitting projection.

8. The unit cell according to claim 7, wherein the separator reinforcing member is made of a synthetic resin material by means of an injection molding using a mold including a pair of reinforcing portions gripping the outer peripheral edge of the separator.

9. A solid polymer electrolyte fuel cell comprising a plurality of unit cells each comprising:
   a membrane/electrode assembly including a fuel electrode and an oxidant electrode disposed on either side of a solid polymer electrolyte membrane, the assembly being sandwiched from either side by a first separator and a second separator to give a stacked construction;
   a fuel gas flow passage formed between opposed faces of the fuel electrode and the first separator; and an oxidant gas flow passage formed between opposed faces of the oxidant electrode and the second separator,
   wherein the solid polymer electrolyte membrane in the membrane/electrode assembly has a planar shape slightly larger than the fuel electrode and the oxidant electrode so that an entire perimeter of an outer peripheral edge portion of the solid polymer electrolyte membrane forms a projecting portion projecting outwardly beyond outer peripheral edges of the fuel electrode and the oxidant electrode, and the projecting portion of the solid polymer electrolyte membrane is coated by a reinforcing resin member affixed thereto, wherein the first separator has a primary-face sealing rubber layer affixed onto a primary face thereof so that the reinforcing resin member is stacked on the first separator via the primary-face sealing rubber layer, and connecting grooves formed on the primary face thereof for connecting both ends of the fuel gas flow passage with a fuel gas feed/discharge ports respectively, which are formed perforating through the first separator, wherein the second separator has a primary-face sealing rubber layer affixed onto a primary face thereof so that the reinforcing resin member is stacked on the second separator via the primary-face sealing rubber layer, and connecting grooves formed on the primary face thereof for connecting both ends of the oxidant gas flow passage with an oxidant gas feed/discharge ports respectively, which are formed perforating through the second separator, wherein the reinforcing resin member is placed so as to bridge openings of the connecting grooves in order to give a tunnel construction to the connecting grooves, wherein the unit cells are stacked in a sandwich direction of the first and second separators with respect to the membrane/electrode assembly, and wherein each connecting groove includes at least one supporting projection projecting upward from a bottom face of the connecting groove, and a portion of the reinforcing resin member extending across the opening of the connecting groove is held in contact with and supported by the supporting projection.

10. The solid polymer electrolyte fuel cell according to claim 9, wherein each of the first and second separators includes a conducting contact part formed at a portion outside a zone forming the fuel gas flow passage or the oxidant gas flow passage projecting toward a secondary face opposite the primary face so that the conducting contact part of the first separator and the conducting contact part of the second separator are held in contact with each other with the unit cells stacked.

* * * * *